(12) United States Patent
Schaefer

(10) Patent No.: US 7,707,693 B2
(45) Date of Patent: May 4, 2010

(54) CONNECTING UNIT FOR LOOSE ENDS OF A TRACTION DEVICE

(75) Inventor: Gerhard Schaefer, Neunkirchen (DE)

(73) Assignee: SSI Schaefer Peem GmbH, Graz (AT)

( * ) Notice: Subject to any disclaimer, the term of this patent is extended or adjusted under 35 U.S.C. 154(b) by 0 days.

(21) Appl. No.: 12/023,169

(22) Filed: Jan. 31, 2008

(65) Prior Publication Data

US 2008/0200295 A1     Aug. 21, 2008

Related U.S. Application Data

(63) Continuation of application No. PCT/EP2006/007586, filed on Aug. 3, 2005.

(30) Foreign Application Priority Data

Aug. 3, 2005 (DE) .................. 10 2005 038 446

(51) Int. Cl.
*F16G 3/00* (2006.01)
*F16G 3/08* (2006.01)

(52) U.S. Cl. .................... 24/31 R; 24/136 B

(58) Field of Classification Search .............. 24/136 R, 24/136 B, 132 WL, 31 R, 32, 68 D, 19, 278, 24/284, 269, 135 R, 71.1; 439/783; 403/374.3, 403/374.4
See application file for complete search history.

(56) References Cited

U.S. PATENT DOCUMENTS

| | | | | |
|---|---|---|---|---|
| 1,507,316 | A | * 9/1924 | Kemper et al. | 24/136 R |
| 4,027,939 | A | * 6/1977 | White | 24/136 B |
| 5,423,699 | A | * 6/1995 | Johnson | 439/783 |
| 6,979,236 | B1 * | 12/2005 | Stanton | 439/783 |

FOREIGN PATENT DOCUMENTS

DE      202 07 499 U1    8/2002

* cited by examiner

*Primary Examiner*—Robert J Sandy
(74) *Attorney, Agent, or Firm*—McNeely & Hare LLP; Kevin J. McNeely

(57) ABSTRACT

A connecting unit for loose ends of a traction device includes a body having a traction device passage to receive the ends of the traction device and a clamping device positioned in the traction device passage. The traction device passage has a first opening into which the ends of the traction device can be inserted. The clamping device is adapted to receive the ends of the traction device and has an adjustment mechanism which biases the clamping device in a direction of a wall of the traction device passage.

14 Claims, 3 Drawing Sheets

CONNECTING UNIT FOR LOOSE ENDS OF A TRACTION DEVICE

RELATED APPLICATIONS

This is a continuation application of co-pending international patent application PCT/EP2006/007586 (WO 2007/014746 A1) which claims priority of the German patent application DE 10 2005 038 446.3, filed on Aug. 3, 2005, which is fully incorporated by reference herewith.

BACKGROUND OF THE INVENTION

The present invention relates to a connecting unit for loose ends of traction device.

RELATED PRIOR ART

In the field of order-picking technique conveyor lines, such as roller conveyors, are typically driven by one or more motors. For this purpose the motors are connected to elements of the conveyor line to be driven via traction device. As a rule, form-closed traction device, particularly toothed belts and chains are used as traction device. Recently, toothed belts have prevailed due to maintenance reasons. A toothed belt can have the shape of an endless belt, and, for example, can be guided around two deflection pulleys being belt sprockets. The deflection pulleys are arranged at the ends of the conveyor line. One of the deflection pulleys can be driven by the motor. The other pulley runs idle or is also driven by the toothed belt.

Endless belts are made from manufacturers either in the form of a ring so that connecting loose belt ends is not necessary, or as yard goods. If yard ware is used the loose ends have to be connected with each other. For this purpose it is known in the prior art to weld the ends to each other, particularly if the yard ware is made of plastic. However, problems arise since welded connections can only transmit 40 to 50% of the force which can be transmitted by belts actually being formed annularly. Common drive belts have a traction carrier consisting, for example, of steel ropes and plastic cores. However, those are interrupted at welding seam locations.

Another problem exists in that belts, which are actually annular, are only available up to lengths of 24 meters at maximum.

Another option for connecting loose belt ends to each other consists of using a fastener. Such fasteners are disclosed in the documents DE 195 34 932 A1 and DE 297 05 941 U1.

The fastener typically is an articulated element having two toothed sections into which the ends of the toothed belt can be put. After placing respective counterparts therein the toothed sections are squeezed with the toothed belts.

This type of toothed belt fastener is irreversible. The squeezed part of the toothed belt cannot be released from the fastener any more. Since an end section of the toothed belt extending over several belts is squeezed, it is no longer possible, after releasing the fastener, to re-close the toothed belt, thus the entire toothed belt becomes useless.

A particular problem is to be seen in that such fasteners occasionally extend in all directions, i.e. fastener elements can be provided in the front, laterally as well as in the back. Then, guiding the fastener around return pulleys is not possible.

SUMMARY OF THE INVENTION

Therefore, it is an object of the present invention to provide an enhanced connecting unit. The connecting unit should be usable particularly for toothed belts, be guidable around return pulleys as well as transmit drive forces by 100%. Further it is desirable that belts, or also single parts of the belt, can be easily replaced.

This object is achieved by a connection unit for loose ends of a traction device, wherein the connecting unit includes a body having a traction device passage for receiving the ends of the traction device, and a clamping device adapted to receive the ends of the traction device and being arranged within the traction device passage, wherein the traction device passage has a first opening into which the ends of the traction device are insertable, and wherein the clamping device has an adjusting mechanism, operation of which urges the clamping device in the direction of a wall of the traction device passage.

By inserting the ends of the traction device to be connected to each other in one and the same opening, the connection unit according to the present invention merely extends at one side of the traction device. Deflection around deflection pulleys and drive pulleys thus is possible without any problem. Due to the short length of the connecting unit smaller pulley diameters can be used.

The clamping device does not squeeze the ends of the traction device but presses the same (reversibly) to the walls of the traction device passage and thus allows load bearing connection of loose ends of the traction device.

Additionally, drive force can be transmitted up to 100% by the connecting unit in accordance with to the invention.

According to a preferred embodiment the adjusting mechanism urges the clamping device in opposite directions against the wall of the traction device passage.

In this case, the traction device is laterally running along the clamping device so that the traction device, if the adjusting mechanism is actuated, respectively is clamped between the wall of the traction device passage and the clamping device.

Even further, it is preferred that the traction device passage has a second opening into which the clamping device can be inserted into the connecting unit from the outside, and that the wall connects the first and second openings to each other.

In this case, the traction device passage passes through the body of the connecting unit completely, the ends of the traction device can be easily inserted into the connecting unit, wherein the clamping device is subsequently inserted into the traction device passage, particularly from opposite direction, in order to clamp the loose ends of the traction device with the body of the connecting unit.

The body of the connecting unit preferably includes a ground plate and at least two jaw elements, wherein the traction device passage is formed between the jaw elements, and the jaw elements are arranged on the ground plate along a longitudinal axis of the ground plate.

In this manner the connecting unit in accordance with the present invention can be formed modularly. This facilitates manufacturing of the individual components as well as adaptation to different dimensions of the track device or the magnitude of forces to be transmitted.

Further, it is advantageous that a cover plate is additionally provided being arranged oppositely to the ground plate having the jaw elements.

The cover plate prevents the clamping device, in clamped state, to jump out of the traction device passage.

The edges of the first opening are, in accordance with another preferred embodiment, rounded in the direction of the traction device passage.

The rounding of the edges prevents the traction device from being loaded too heavily at a location where it enters the connecting unit which could lead to damage of the traction device. Thus, the lifetime of the traction device is increased.

Preferably, the traction device passage tapers wedge-shaped from the second opening in the direction of the interior of the body of the connecting unit.

The wedge shape facilitates the clamping of the loose ends of the traction device with the clamping device by moving the clamping device particularly away from the second opening, i.e. is inserted deeper into the traction device passage, so that the forces applied on the wall of the traction device passage are increased further.

According to another embodiment the clamping device includes a wedge-shaped element being formed such that its side faces, building an acute angle with respect to each other, clamp the ends of the traction device between each other and the wall, if the ends of the traction device are inserted into the first opening.

As already mentioned above, the wedge shape facilitates application of forces onto the wall of the traction device passage.

Additionally, it is advantageous that the clamping device includes a wedge-shaped element and a separate receiving element for each end of the traction device.

In this case, the clamping device is at least formed by three parts which increases the possibilities of how to connect the loose ends of the traction device to each other.

According to another preferred embodiment the clamping device additionally includes a locking bar, and the body of the connecting unit comprises in the region of the second opening additional recesses into which the locking bar is insertable such that the wedge-shaped element cannot escape from the traction device passage, if the wedge-shaped element is completely located within the traction device passage.

The locking bar represents an element effecting counter-force necessary for the clamping, so that the ends of the traction device cannot release by themselves. Further, the clamping device acts self-clamping. The more tensile stress is applied to the traction device, the stronger the clamping device is squeezed by being pulled in the direction of the first opening.

Additionally, it is advantageous that the adjusting mechanism includes at least one screw being guided through the passage within the locking bar such that the wedge-shaped element can be moved into the traction device passage.

This measure ensures that the force applied for clamping can be changed afterwards, particularly can be increased.

Another advantage has to be seen in that the adjusting mechanism includes another screw guided through a non-threaded passage within the locking bar and which can be screwed into a threaded bore of the wedge-shaped element.

This measure ensures that the clamping device can be also moved out of the traction device passage if the loose ends of the traction device have been clamped heavily with each other (in advance).

Preferably, the receiving element respectively comprises a first side for receiving one end of the traction device, and a second side arranged opposite to the first side and contacting the wedge-shaped element in inserted state.

The wedge-shaped element can also slide along the back of the receiving element, so that the strength by which the traction device is tightened, by moving the wedge-shaped element further down the traction device passage, can be varied in a simple manner.

According to another embodiment the receiving element has an L-shaped section, the shorter leg thereof extending externally from the second opening in an inserted state, wherein in the area of the shorter leg another adjusting mechanism, or particularly a radical screw, is provided.

By the aid of the other adjusting mechanism the force can be adjusted by which the traction device is tightened.

According to another embodiment the traction device has a profile at least at one side, particularly being formed as toothed belt. Preferably, the reception of the ends of the traction device happens form-closed.

It is to be understood that the above-mentioned and the following features to be explained can be used not only in the respectively indicated combination but also in other combinations or alone without departing from the scope of the present invention.

BRIEF DESCRIPTION OF THE DRAWINGS

Embodiments of the invention are depicted in the drawings and will be explained in more detail with reference to the following description, wherein:

In the following description like elements are designated by like reference numerals.

FIG. 1 shows a top view of a connecting unit 10 in accordance with the present invention.

DETAILED DESCRIPTION OF PREFERRED EMBODIMENTS

The connecting unit 10 includes a body 12 and a clamping device 14.

Figure 1:
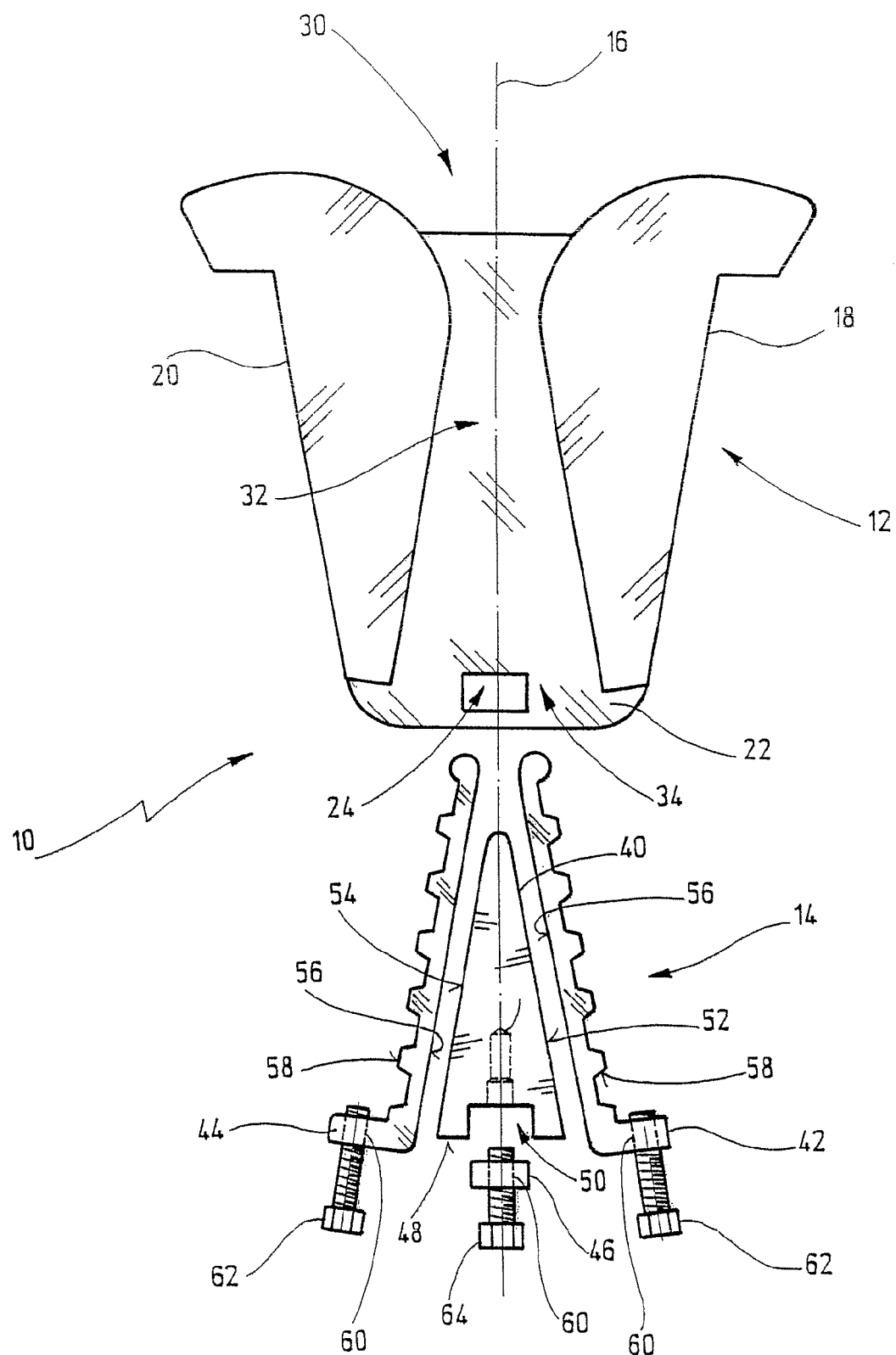
FIG. 1 is a schematic top view of a connecting unit according to the present invention.

In FIG. 1 the connecting unit 10 is depicted along its longitudinal axis 16. The body 12 comprises two jaw elements 18 and 20 arranged at left hand side and right hand side of the center axis 16, respectively. The jaw elements 18 and 20 are connected to a ground plate 22. The ground plate 22 has an opening 24, the function of which will be explained in more detail in the following. Additionally, cover plate 26 (not shown in FIG. 1) can be provided, but is not shown in the illustration of FIG. 1 for simplification purposes. This cover plate 26 also has an opening 28 (cf. FIG. 2) arranged opposite to the opening 24 of the ground plate 22 in assembled state of the body 12.

Both of the jaw elements 18 and 20 have, according to the embodiment shown in FIG. 1, a substantially L-shaped cross section. The short legs of the L-shaped cross section are rounded towards the center axis 16. The roundings define first opening 30 into which loose ends of traction devices, for example of toothed belts, can be inserted for connection (cf. also FIG. 3). The space between the two jaw elements 18, 20 along the longitudinal axis 16 defines traction device passage 32. Within the traction device passage 32 the ends of the toothed belts (not shown) are squeezed by the clamping device 14 for connecting the loose ends of the toothed belt to each other in a form-closed manner. The jaw elements 18 opposite to the first opening 30, 20 define a second opening 34 into which the clamping device 14 can be inserted from the outside into the traction device passage 32.

The clamping device 14 comprises a wedge 40, two receiving elements 42, 44 as well as a locking bar 46.

The wedge 40 has a recess 50 at its base side 48 being that broad that the locking bar 46 can be received. The other two sides 52 and 54 of the wedge 40 together form an acute angle, and here are formed smoothly.

The two receiving elements 42 and 44 here have an L-shaped cross section. Side 56 opposite to the wedge 40 preferably is formed smoothly, too. The advantage thereof is that the receiving elements 42 and 44, if they are inserted in combination with the wedge 40 into the traction device passage 32 (cf. also FIG. 3), can better slide along the faces 52 and 54 of the wedge 40. Due to the relative movement of the wedge 40 against the receiving elements 42 and 44 the force can be increased by which the loose ends of the toothed belt can be connected to each other in a form-closed manner. The connection is described in more detail in the context of FIG. 3.

The receiving elements 42 and 44 comprise a negative toothing on side 58 opposite to side 56, in order to allow form-closed reception of the toothed belts being not depicted in FIG. 1. The shape of the side 58 depends on the profile of the ends of the traction device to be connected to each other.

Figure 3:
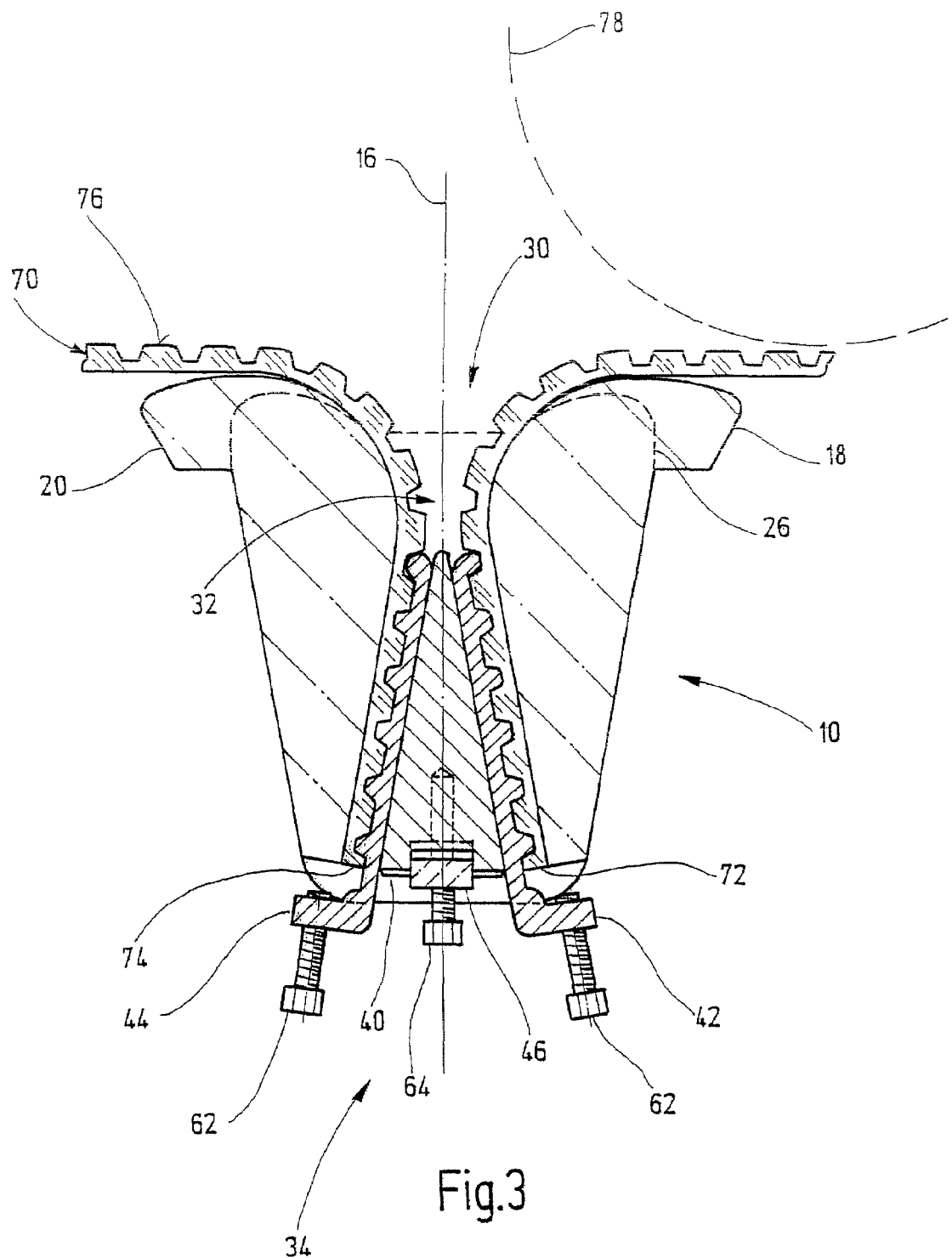
FIG. 3 is a sectional view through the connecting unit of FIG. 2 in a squeezed state.

Further, the receiving elements 42 and 44 comprise threaded bores 60 within a region projecting over the jaw elements 18 and 20 from the traction device passage 32 in assembled state (cf. FIG. 3). Due to the threaded bore 60 screws 62 can be screwed in.

The locking bar 46 also comprises at least one threaded bore 60, for respectively receiving another screw 64.

Further, the wedge 40 comprises in the region of the recess 50 a bore 51, the function of which will be explained in greater detail below.

Figure 2:
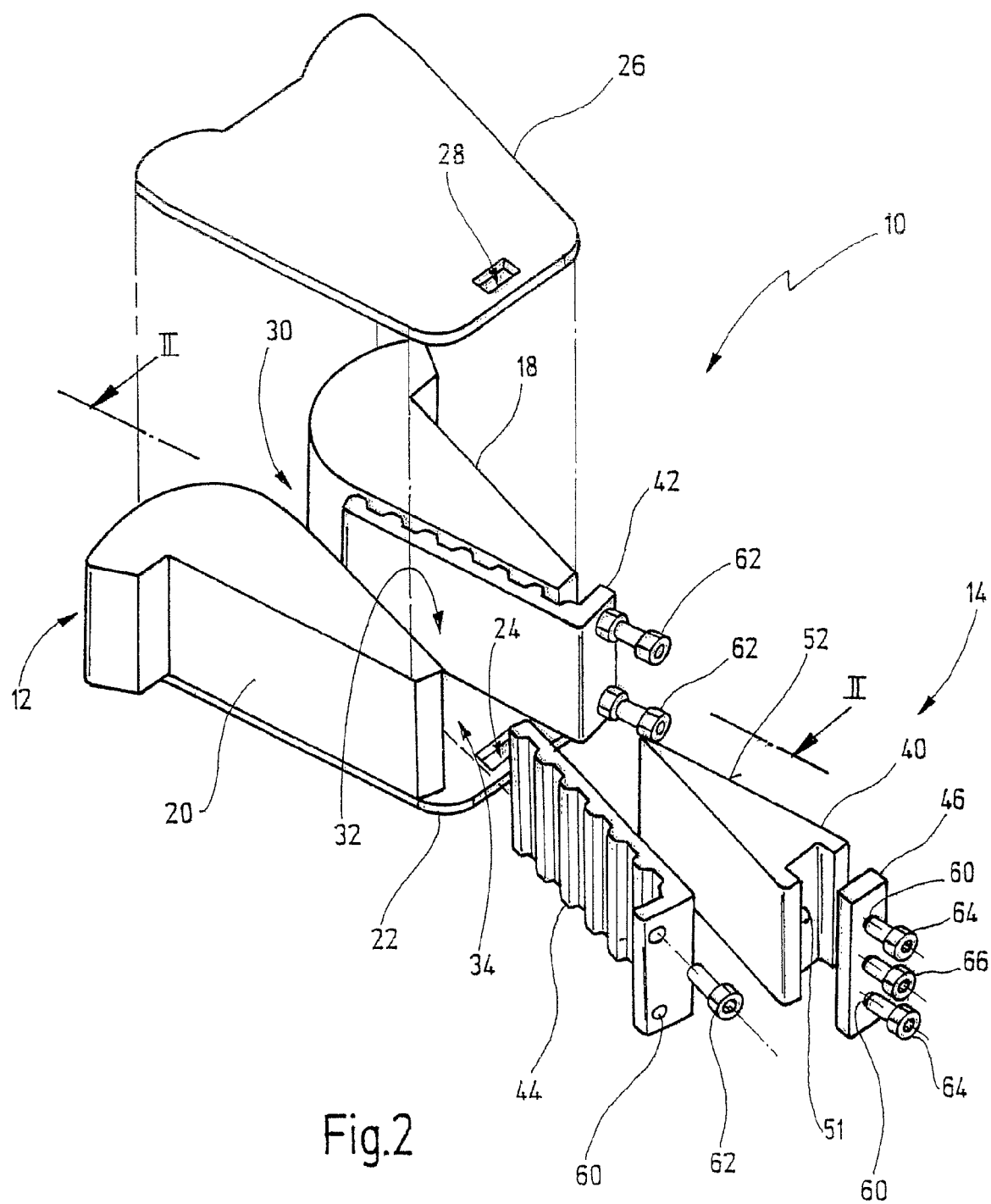
FIG. 2 is a schematic perspective view of the connecting unit of FIG. 1.

Referring to FIG. 2 the connecting unit 10 of FIG. 1 is depicted in a perspective view.

The cover plate, not depicted in FIG. 1 for facilitating the illustration, is depicted in FIG. 2 as being lifted from the jaw elements 18 and 20. The connection between the cover plate 26 and the remaining body 12, for example, can be achieved by using screws. However, the cover plate 26 can also be secured to the rest of the body 12 in a fixed manner by riveting, welding, etc. the cover plate 26 onto the jaw elements 18 and 20. Further, the opening 28 within the cover plate 26 is shown. In assembled state of the body 12 the opening 28 is located opposite to the opening 24 of the ground plate 22.

In FIG. 2 the receiving element 42 is arranged within the traction device passage 32. One can see that in a neck region of the receiving element 42 two adjusting screws 62 are provided, by the aid of which the insertion depth of the receiving element 42 into the traction device passage 32 can be varied.

Also, the locking bar 46 is depicted in FIG. 2 in more detail. The locking bar 46 is provided with two lateral threaded bores 60 into which the screws 64 can be screwed in. By the aid of the screws 64 the penetration depth of the wedge 40 into the traction device passage 32 can be varied. Another screw 66 can be provided between the two lateral screws 64, the screw 66 being insertable into (not shown) bore of the locking bar 46 not having any thread. The screw 66 can be screwed into the threaded bore 51 of the recess 50 within the wedge 40. The wedge 40 can also be moved from the traction device passage 32 by the aid of the screw 46 after squeezing of the ends of the traction device has occurred. As a rule, the clamping device 14 is squeezed within the traction device passage 32 heavily so that manual release of the clamping device is not possible.

With reference to FIG. 3 the connecting unit 10 is illustrated in a schematic elevational view, wherein the connecting unit 10 connects two ends 72 and 74 of a toothed belt 70 with each other by frictional connection.

For this purpose the toothed ends 72 and 74 have been inserted from the outside into the first opening 30. The clamping device 14 are inserted into the traction device passage 32 through the second opening 34. Therefore, first the receiving elements 42 and 44 are inserted and subsequently the wedge 40 is arranged between these receiving elements 42 and 44.

In order to arrest the wedge 40 within the traction device passage 32 the locking bar 64 is inserted into the openings 24 and 28 (cf. FIG. 2) from the outside. The length of the locking bar 46 preferably is selected such that the bar 46 flushes with the ground plate 22 and the cover plate 46 in the inserted state. The size of the openings 24 and 28 in the axial direction 16 is selected such that sufficient clearance is provided in order to insert the locking bar 46.

Now, also the function of the recess 50 within the wedge 40 becomes clear. The recess 50 within the wedge 40 serves for receiving the locking bar 46. The orientation of the wedge 40 relative to the axis 60 can be adjusted by the screws 64. The deeper the screws 64 are screwed in, the "deeper" the wedge will be urged into the traction device passage 32. The recess 50, therefore, preferably is formed such that the bottom of the recess 50 forms a stop for the screws 64. A threaded bore 51 is merely provided for the screw 66 (cf. FIG. 2) in the bottom of the recess 50. By screwing in the screw 64 the wedge 40, in the squeezed state, can be screwed out of the traction device passage 32.

The screw 62 provided at the receiving elements 42 and 44 in the region of the second opening 34 serves to adjust the penetration depth of the receiving elements 42 and 44 in the traction device passage 32. The jaw elements 18 and 20 serve as stops. The screws 62 of the receiving means 42 and 44 are shown in FIG. 3 in a state in which the jaw elements 18 and 20 do not contact the same. However, the screw 62 could be screwed in into the direction of the jaw elements 18 and 20 for urging, in turn, the receiving elements 42 and 44 in the direction of the second opening 34, i.e. out of the traction device passage 32. In this manner, the toothed belt 70 can be stretched arbitrarily.

Since both ends 72 and 74 of the toothed belt 70 are inserted at the same side of the connecting unit 10, i.e. through the first opening 30, into the connecting unit 10, no elements are arranged at the side 76 of the toothed belt 70 having the profile. Consequently, it is possible to guide a toothed belt 70 connected with the connecting unit 10 around a deflection pulley 78 indicated by phantom lines in FIG. 3.

Generally, it is to be noted that the connecting unit 10 of the invention is very flat, preferably has the size of the width of the toothed belt 70.

According to another embodiment the clamping device 14 can also be assembled of less elements. The receiving elements 42 and 44 could be omitted, wherein the faces 52 and 54 of the wedge 40 should be provided with a negative profile if a toothed belt 70 having a profile is to be squeezed.

Alternatively, the wedge 40 could be mounted axially movable within the traction device passage 32 such that it does not have to be inserted from the outside through the second opening 34 into the traction device passage 32. In this case, one has to take care only of providing a suitable adjusting mechanism by which the axial position of the wedge 40 can be adjusted.

It is to be noted that the number of different adjusting screws can be chosen arbitrarily. With the depicted embodiments respectively only two adjusting screws are provided for ensuring redundancy required for safety reasons. It is also clear that other adjusting mechanisms could be used instead of screws (e.g. click-stop fasteners or the like).

Also the shape of the jaw elements 18 and 20 can be varied. With the embodiment described here the jaw elements 18 and 20 are formed round in the region of the first opening 30. However, other shapes are possible. L-shape is not necessarily required.

The shape of the traction device passage 32 can be varied. In FIGS. 1 to 3 the traction device passage 32 is always depicted with a base area having a triangular shape. However, the traction device passage 32 could alternatively have a base area of rectangular shape. In this case, the wedge 40 were to be replaced by an ashla-shaped element onto which the adjusting mechanism effects a separating movement on the sides opposite to the jaw elements 18 and 20.

Therefore, what is claimed is:

1. Connecting unit for loose ends of a traction device, comprising:
    a body having a traction device passage for receiving the ends of the traction device, and a clamping device being adapted for receiving the ends of the traction device and being arranged within the traction device passage, the traction device passage having a first opening into which the ends of the traction device are to be inserted, and the clamping device comprising an adjusting mechanism, operation of which urges the clamping device in a direction of a wall of the traction device passage;
    wherein the body comprises a ground plate, a cover plate opposite to the ground plate, and at least two jaw elements, the traction device passage being formed between the jaw elements, and the jaw elements being arranged on the ground plate along a longitudinal axis of the ground plate.

2. Connecting unit of claim 1, wherein the adjusting mechanism urges the clamping device in opposite directions against the wall of the traction device passage.

3. Connecting unit of claim 1, wherein the traction device passage has a second opening into which the clamping device can be inserted from outside into the connecting unit, and the wall connects the first opening and the second opening with each other.

4. Connecting unit of claim 1, wherein the traction device passage passes through the body.

5. Connecting unit of claim 1, wherein the edges of the first opening are rounded in the direction of the traction device passage.

6. Connecting unit of claim 1, wherein the traction device passage tapers in a wedge-shaped manner from a second opening to the interior of the body.

7. Connecting unit of claim 1, wherein the clamping device includes a wedge-shaped element which is formed such that its side faces, forming an acute angle with each other, squeeze the ends of the traction device between themselves and the wall, if the ends of the traction device are inserted into the first opening.

8. Connecting unit of claim 1, wherein the clamping device comprises a wedge-shaped element and has a receiving element for each end of the traction device.

9. Connecting unit for loose ends of a traction device, comprising:
    a body having a traction device passage for receiving the ends of the traction device, and a clamping device being adapted for receiving the ends of the traction device and being arranged within the traction device passage, the traction device passage having a first opening into which the ends of the traction device are to be inserted, and the clamping device comprising an adjusting mechanism, operation of which urges the clamping device in a direction of a wall of the traction device passage:
    wherein the clamping device comprises
        a wedge-shaped element and has a receiving element for each end of the traction device; and
        a locking bar, and wherein the body of the connecting unit has in the region of a second opening additional recesses into which the locking bar can be inserted such that the wedge-shaped element, if completely located within the traction device passage, cannot escape from the traction device passage.

10. Connecting unit of claim 9, wherein the adjusting mechanism includes at least one screw being guided through a transit within the locking bar such that the wedge-shaped element can be moved into the traction device passage.

11. Connecting unit of claim 10, wherein the adjusting mechanism includes a further screw, which is guided through a non-threaded transit within the locking bar and can be screwed into a threaded bore within the wedge-shaped element.

12. Connecting unit for loose ends of a traction device, comprising:
    a body having a traction device passage for receiving the ends of the traction device, and a clamping device being adapted for receiving the ends of the traction device and being arranged within the traction device passage, the traction device passage having a first opening into which the ends of the traction device are to be inserted, and the clamping device comprising an adjusting mechanism, operation of which urges the clamping device in a direction of a wall of the traction device passage;
    wherein
        the clamping device comprises a wedge-shaped element and has a receiving element for each end of the traction device, and
        each receiving element comprises a first side for receiving the ends of the traction device, and a second side arranged opposite to the first side and contacting the wedge-shaped element in the inserted state.

13. Connecting unit for loose ends of a traction device, comprising:
    a body having a traction device passage for receiving the ends of the traction device, and a clamping device being adapted for receiving the ends of the traction device and being arranged within the traction device passage, the traction device passage having a first opening into which the ends of the traction device are to be inserted, and the clamping device comprising an adjusting mechanism, operation of which urges the clamping device in a direction of a wall of the traction device passage;
    wherein
        the clamping device comprises a wedge-shaped element and has a receiving element for each end of the traction device, and
        the receiving element has an L-shaped cross section, a shorter leg thereof projecting, in the inserted state, through the second opening to the outside, wherein, in the region of the short leg, a second adjustment mechanism is provided.

14. Connecting unit of claim 13, wherein the second adjustment mechanism comprises a screw.

* * * * *